(12) United States Patent
Herrmann et al.

(10) Patent No.: US 11,870,028 B2
(45) Date of Patent: Jan. 9, 2024

(54) ELECTRIC VEHICLE BATTERY CELL WITH INTERNAL SERIES CONNECTION STACKING

(71) Applicants: Volkswagen AG, Wolfsburg (DE); AUDI AG, Ingolstadt (DE); Dr. Ing. h.c. F. Porsche AG, Stuttgart (DE)

(72) Inventors: Mirko Herrmann, Mountain View, CA (US); Angela Speidel, Mountain View, CA (US)

(73) Assignees: Volkswagen AG, Wolfsburg (DE); Audi AG, Ingolstadt (DE); Dr. Ing. h.c. F. Porsche AG, Stuttgart (DE)

( * ) Notice: Subject to any disclaimer, the term of this patent is extended or adjusted under 35 U.S.C. 154(b) by 1753 days.

(21) Appl. No.: 15/432,390

(22) Filed: Feb. 14, 2017

(65) Prior Publication Data
US 2018/0233768 A1    Aug. 16, 2018

(51) Int. Cl.
| | |
|---|---|
| *H01M 10/0525* | (2010.01) |
| *H01M 10/0585* | (2010.01) |
| *H01M 10/04* | (2006.01) |
| *H01M 4/66* | (2006.01) |
| *H01M 4/134* | (2010.01) |
| *B60L 50/64* | (2019.01) |

(Continued)

(52) U.S. Cl.
CPC ......... *H01M 10/0525* (2013.01); *B60L 50/64* (2019.02); *H01M 4/134* (2013.01); *H01M 4/661* (2013.01); *H01M 4/667* (2013.01); *H01M 10/0418* (2013.01); *H01M 10/0585* (2013.01); *H01M 50/10* (2021.01); *H01M 50/204* (2021.01); *H01M 50/627* (2021.01); *H01M 2220/20* (2013.01); *H01M 2300/0085* (2013.01)

(58) Field of Classification Search
None
See application file for complete search history.

(56) References Cited

U.S. PATENT DOCUMENTS

| | | |
|---|---|---|
| 3,819,412 A | 6/1974 | Taylor et al. |
| 4,164,068 A | 8/1979 | Shropshire et al. |

(Continued)

FOREIGN PATENT DOCUMENTS

| | | |
|---|---|---|
| CA | 2835915 A1 | 11/2012 |
| CN | 1303525 A | 7/2001 |

(Continued)

OTHER PUBLICATIONS

Watanabe et al. (JP, 2005-259379) (a raw machine translation) (Abstract, Detailed Description & Drawings) (Sep. 22, 2005) (Year: 2005).*

(Continued)

*Primary Examiner* — Carmen V Lyles-Irving
(74) *Attorney, Agent, or Firm* — Davidson, Davidson & Kappel, LLC

(57) ABSTRACT

A battery module includes a plurality of battery cells connected in series, each battery cell having a cathode, an anode, and a separator separating the cathode and the anode, and a bipolar current collector; a plurality of polymer frames, each having a window to receive part of the one of the plurality of battery cells; two of the plurality of polymer frames defining a compartment; and electrolyte filling the compartment for one of the plurality of battery cells. A method is also provided.

13 Claims, 6 Drawing Sheets

(51) Int. Cl.
*H01M 50/10* (2021.01)
*H01M 50/204* (2021.01)
*H01M 50/627* (2021.01)

(56) References Cited

U.S. PATENT DOCUMENTS

| | | |
|---|---|---|
| 4,539,268 A | 9/1985 | Rowlette et al. |
| 4,576,881 A | 3/1986 | Hasenauer et al. |
| 4,737,257 A | 4/1988 | Boulton |
| 5,518,839 A | 5/1996 | Olsen et al. |
| 5,618,641 A | 4/1997 | Arias et al. |
| 5,688,615 A | 11/1997 | Mrotek et al. |
| 6,022,642 A | 2/2000 | Tsukamoto et al. |
| 6,576,365 B1 | 6/2003 | Meitav et al. |
| 6,696,204 B2 | 2/2004 | Sate et al. |
| 6,743,546 B1 | 6/2004 | Kaneda et al. |
| 6,752,842 B2 | 6/2004 | Luski et al. |
| 7,097,937 B2 | 8/2006 | Fredriksson et al. |
| 7,648,538 B2 | 1/2010 | Oogami et al. |
| 7,824,806 B2 | 11/2010 | Visco et al. |
| 8,415,049 B2 | 4/2013 | Shimamura et al. |
| 8,445,139 B2 | 5/2013 | Hosaka et al. |
| 9,362,547 B2 | 6/2016 | Sabi et al. |
| 9,818,996 B2 | 11/2017 | Miyake |
| 10,147,968 B2 | 12/2018 | Visco |
| 2003/0013012 A1 | 1/2003 | Ahn et al. |
| 2003/0041444 A1 | 3/2003 | Debe et al. |
| 2003/0194605 A1 | 10/2003 | Fauteux et al. |
| 2004/0067417 A1 | 4/2004 | Oosawa et al. |
| 2004/0091771 A1 | 5/2004 | Hosaka et al. |
| 2004/0241525 A1 | 12/2004 | Mekala et al. |
| 2004/0253512 A1 | 12/2004 | Watanabe et al. |
| 2005/0089751 A1 | 4/2005 | Oogami et al. |
| 2006/0134502 A1 | 6/2006 | Garceau et al. |
| 2008/0003493 A1 | 1/2008 | Bates et al. |
| 2009/0233164 A1 | 9/2009 | Shimamura |
| 2010/0304191 A1 | 12/2010 | West et al. |
| 2011/0014520 A1 | 1/2011 | Ueda et al. |
| 2011/0206974 A1 | 8/2011 | Inoue et al. |
| 2011/0217595 A1 | 9/2011 | Kelnberger |
| 2011/0308935 A1 | 12/2011 | Yamazaki et al. |
| 2012/0115020 A1 | 5/2012 | Hwang et al. |
| 2013/0065110 A1* | 3/2013 | Faust .................. H01M 10/044 429/163 |
| 2013/0101878 A1 | 4/2013 | Pilgram |
| 2013/0108899 A1 | 5/2013 | Schaefer |
| 2013/0157111 A1 | 6/2013 | Chami |
| 2013/0162216 A1 | 6/2013 | Zhamu et al. |
| 2013/0302695 A1 | 11/2013 | Beer et al. |
| 2014/0045040 A1 | 2/2014 | Chami et al. |
| 2014/0178745 A1 | 6/2014 | Kwon et al. |
| 2014/0329126 A1 | 11/2014 | Ho et al. |
| 2014/0349147 A1 | 11/2014 | Shaffer, II et al. |
| 2014/0363748 A1 | 12/2014 | Kritzer et al. |
| 2015/0044576 A1 | 2/2015 | Eisele et al. |
| 2015/0050537 A1 | 2/2015 | Christensen et al. |
| 2015/0093627 A1 | 4/2015 | Busch et al. |
| 2015/0280177 A1 | 10/2015 | Keates et al. |
| 2016/0028134 A1 | 1/2016 | Takechi et al. |
| 2016/0104913 A1 | 4/2016 | Moreau |
| 2016/0141623 A1 | 5/2016 | Yoon et al. |
| 2016/0156065 A1 | 6/2016 | Visco et al. |
| 2016/0329535 A1 | 11/2016 | Moomaw et al. |
| 2017/0263951 A1 | 9/2017 | Kanno et al. |
| 2017/0294662 A1 | 10/2017 | Madden et al. |
| 2017/0294672 A1 | 10/2017 | Warrington et al. |
| 2018/0233721 A1 | 8/2018 | Herrmann et al. |
| 2018/0233752 A1 | 8/2018 | Herrmann et al. |
| 2018/0233768 A1 | 8/2018 | Herrmann et al. |
| 2018/0233782 A1 | 8/2018 | Herrmann et al. |
| 2019/0044129 A1 | 2/2019 | Yadav |

FOREIGN PATENT DOCUMENTS

| | | |
|---|---|---|
| CN | 1337757 A | 2/2002 |
| CN | 1408128 A | 4/2003 |
| CN | 1499664 A | 5/2004 |
| CN | 1619859 A | 5/2005 |
| CN | 1795575 A | 6/2006 |
| CN | 1912522 A | 2/2007 |
| CN | 101076915 | 11/2007 |
| CN | 103334147 A | 10/2013 |
| CN | 103443994 A | 12/2013 |
| CN | 103730684 A | 4/2014 |
| CN | 103959507 A | 4/2014 |
| CN | 103840212 A | 6/2014 |
| DE | 102010013031 A1 | 9/2011 |
| DE | 102011003186 A1 | 7/2012 |
| DE | 102012213110 A1 | 1/2014 |
| EP | 1487034 A2 | 12/2004 |
| EP | 1841001 | 10/2007 |
| EP | 2609643 B1 | 6/2014 |
| EP | 2804697 A1 | 11/2014 |
| EP | 2843734 A2 | 3/2015 |
| GB | 2477552 | 8/2011 |
| JP | 2005-259379 | 9/2005 |
| JP | 2005259379 | 9/2005 |
| JP | 2009117052 A | 5/2009 |
| JP | 2010277811 | 12/2010 |
| KR | 20080036139 A | 4/2008 |
| WO | WO9210861 | 6/1992 |
| WO | WO 1997038461 A1 | 10/1997 |
| WO | WO2009029746 | 3/2009 |
| WO | WO 2010049478 A1 | 5/2010 |
| WO | WO 2011134613 A1 | 11/2011 |
| WO | WO2012/025505 | 3/2012 |
| WO | WO2013109641 | 7/2013 |
| WO | WO 2013131624 A1 | 9/2013 |
| WO | 2609643 B1 | 6/2014 |
| WO | WO2015083825 | 6/2015 |
| WO | WO2016/057457 | 4/2016 |

OTHER PUBLICATIONS

Compartment, n., Oxford English Dictionary (Sep. 2022).*
Define, v., Oxford English Dictionary (Dec. 2022).*
Definition of fixedly, www.dictionary.com, Oct. 23, 2018 (Year: 2018).
Definition of connected, www.google.com, Oct. 23, 2018 (Year: 2018).
Key technologies for electric motorization, downloaded from http://www.toyota-global.com/innovation/environmental_technology/keytech/, 5 pages, downloaded on Feb. 14, 2017.

* cited by examiner

ELECTRIC VEHICLE BATTERY CELL WITH INTERNAL SERIES CONNECTION STACKING

FIELD OF THE INVENTION

The present invention relates generally to electric vehicles and more particularly to batteries for electric vehicles.

BACKGROUND

In conventional lithium-ion battery cells, the electrolyte wets all electrodes in a housing. All electrodes wetted by the electrolyte thus are in a parallel connection with a high capacity. To increase the voltage, the cells with their individual housings need to be stacked in series.

Battery cells in series are known.

U.S. Patent Publication No. 2013/0157111 for example discloses an assembly of batteries, i.e. a battery pack, which can be produced without any additional electrical connection, by connecting several batteries in series. To accomplish this, the multiple batteries are stacked, bringing into contact contacts of reverse polarity between two adjacent batteries. By stacking ten batteries with identical bipolar elements of unit power equal to 15 Wh, an assembly or battery pack can be obtained which is able to supply a voltage of 240 V. U.S. Patent Publications 2014/0045040 and 2016/0104913 disclose other batteries from the same assignee.

U.S. Patent Publication No. 2013/0101878 discloses a battery comprising a plurality of self-contained, substantially cuboid cell housings, in each of which a side face is formed at least in some regions as a negative pole and the opposite side face is designed at least in some regions as a positive pole. Electrolyte in each case fills the space between a bimetal and metal bodies, in which in each case an anode and a cathode of the metal body or the bimetal is arranged, so that an electrochemical cell is formed on each side of the bimetal. The electrodes are in each case separated from one another by an iron-permeable but electrically insulating separator in order to avoid a short circuit between the electrodes. The bimetal is installed on a frame and ionically sealed in the contact region by means of a seal so that no iron bridge over the bimetal is formed. The two electrochemical cells are thus separated from one another ionically but there is a closed electric circuit via the bimetal, so that two electrochemical cells are connected in series between the two poles of the cell housing.

U.S. Patent Publication No. 2004/0253512 discloses a battery element 9 is comprised of several unit cells (unit cell layers). The number of times for the bipolar electrodes (inclusive of the outermost non-bipolar electrodes) to be stacked is adjusted depending upon desired output voltage. If the terminal voltage of the unit cell is set to 4.2 V, the terminal voltage (battery voltage) of the battery element comprised of series connected unit cell layers equivalent to ten cells lies at 42 V.

SUMMARY OF THE INVENTION

The manufacture and assembly of such series-stacked battery cells can be expensive and difficult. For example, U.S. Patent Publication No. 2013/0157111 describes use of a mold and resin.

Moreover, many of the battery components can suffer vibrations or movement, and the sealing of the electrolyte can be compromised, which can lead to battery cell failure.

The present invention provides a battery module comprising:
 a plurality of battery cells connected in series, each battery cell having a cathode, an anode, and a separator separating the cathode and the anode, and a bipolar current collector;
 a plurality of polymer frames, each having a window to receive part of the one of the plurality of battery cells; and
 two of the plurality of polymer frames defining a compartment; and
 electrolyte filling the compartment for one of the plurality of battery cells.

The present invention advantageously creates a battery modules with separate electrolyte compartments permitting series connection, with the frames permitting an easy assembly and a stable battery.

A separate housing may be provided that forms part of the compartment, or the frames can be sealed directly at their edges.

A liquid or gel electrolyte can be used as the electrolyte, since the compartments are sealed.

The polymer frame may be for example be a rigid structure or a dense foil, perforated foil, porous foil, adhesive tape or adhesive foil, and may be for example be made of polyethylene, polypropylene or a mixture of the two.

The polymer frames advantageously can be connected in advance to a component of the battery cell, for example the bipolar current collector or the separator. The battery then can be easily assembled, and the component attached to the frame can be very stably supported.

Advantageously, the bipolar current collector can be attached to the frame, for example by gluing, welding heat bonding, lamination or adhesive tape. Advantageously, a nickel-coated side of an aluminum bipolar current collector can be attached directly to the frame.

The polymer frame for example may have at least one feed hole, most preferably four, that for example can fit over rods to aid in processing the stack. If sealing between the compartments is desired and the rods are being used. The rods can be removed. Excess frame material, including the feed holes, then can be trimmed off and discarded or reused, and the housing attached for sealing.

The present invention also provides a method for manufacturing a battery module comprising:
 stacking a plurality of battery cell units, each battery cell unit including a polymer frame having a window and a battery cell having a cathode, an anode, and a separator separating the cathode and the anode, and a bipolar current collector, the window receiving part of the battery cell;
 connecting a housing to the polymer frames, two of the plurality of polymer frames and the housing defining a compartment; and
 filling the compartment with electrolyte.

The method may include first providing part of the housing, for example an end frame with attached side walls, or an existing housing, into which an electrode, for example a cathode, is fitted, followed by a separator, and another electrode, for example an anode. A liquid electrolyte can then be added, and a polymer frame with an already attached current bipolar collector over the window can be placed over the anode. The polymer frame can be attached to the housing side walls in a sealed fashion, such as by gluing welding heat bonding, lamination or adhesive tape. The welding heat bonding can for example advantageously happen from outside the housing.

The next cathode can then be placed on the current collector, followed by the separator and another anode. Liquid electrolyte can be added and then the next polymer frame/bipolar current collector, which is then sealed to the housing, and so on. Once the desired number of cells have been added, a last polymer frame with an end plate can be attached.

Advantageously, the frames may be added using rods and rods holes in the frames, the rods then being removable.

BRIEF DESCRIPTION OF THE DRAWINGS

The following describe several nonlimiting embodiments of the present invention, in which.

DETAILED DESCRIPTION OF THE PREFERRED EMBODIMENTS

Figure 1:
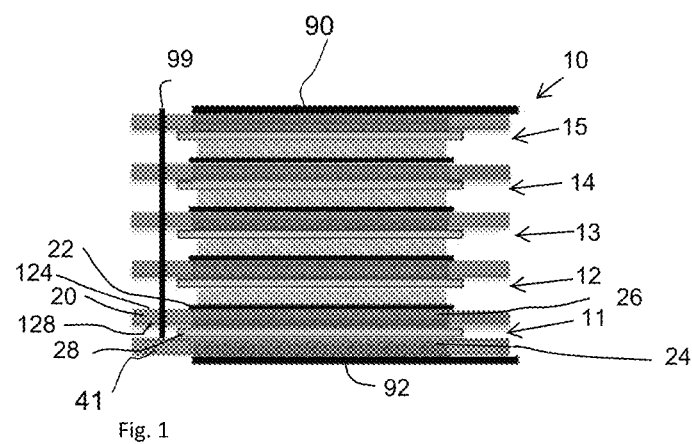
FIG. 1 shows a side view of a plurality of stacked battery components in a first embodiment of the present invention.

FIG. 1 shows a battery cell module 10 with five stackable battery components 11, 12, 13, 14, 15 having electrode components according to an embodiment of the present invention.

Each battery component 11, 12, 13, 14, 15 includes an anode 24, a separator 28, a cathode 26 and a bipolar current collector 22. Each component also includes a polymer frame 20, which on one planar side 124 is attached to the bipolar current collector 22 and on an opposite planar side 128 has the separator 28. Polymer frame 20 in this embodiment is a polymer foil, and the attachment of separator 28 to frame 20 will be described in more detail with respect to FIGS. 3a, 3b and 3c.

Separator 28 can be a dielectric material, for example a porous polyethylene or polyethylene-polypropylene foil (typically 8 to 25 μm thickness).

Polymer frame 20 can be made for example of polypropylene (PP), polyethylene (PE), acrylnitrile butadiene-styrene (ABS), polyamide (PA), polylactic acid (PLA), poly (methyl methacrylate) (PMMA), polycarbonate (PC), polyethylene terephthalate (PET), polystyrene (PS), polyvinyl chloride (PVC), polyphenylene sulfide (PPS), polyphenylene oxide (PPO), Polyetherimide (PEI), polyether ether ketone (PEEK), polyether sulfone (PES), polybenzimidazole (PBI), nylon and composite foil or multilayer foil made of aluminum foil coated with a polymer for example polypropylene. Most preferably, the polymer frame is a PE/PP mixture.

While typical electrolytes such as liquids or gels advantageously may be used, the present invention also can incorporate solid-state electrolytes like lithium oxide or sulfide glasses or glass ceramics or ceramics as electrolytes. Bipolar current collector 22 can be made of copper or aluminum or nickel-coated aluminum or nickel for example. Anode 24 and cathode 26 can be deposited for example by vapor deposition or other film technology on the bipolar current collector 22 or on the separator 28, respectively.

Figure 2:
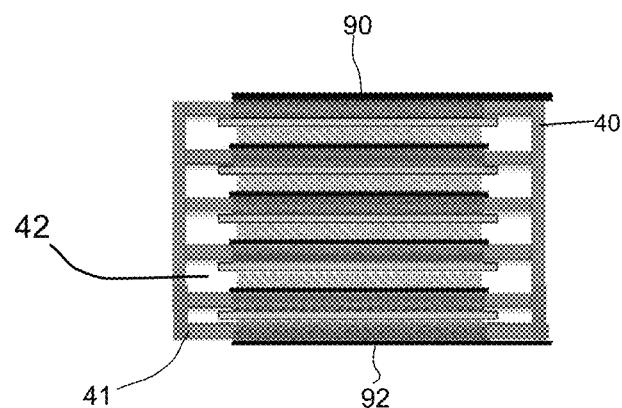
FIG. 2 shows a side view of the embodiment of FIG. 1 with a housing connected to the polymer frames of the battery components to form a battery module.

FIG. 2 shows a side view of the embodiment of FIG. 1 with a housing 40 connected to the polymer frames 20 of the battery components 11 to 15 to form a battery module cell. Housing 40 has a bottom end frame 41, which can be similar to polymer frames 20. The housing can have for example four walls to cover each side of polymer frames 20, which preferably have a rectangular outer shape.

Housing 40 may be made of the same material as polymer frames 20 for example, or of a different polymer material.

A rod 99 as shown in FIG. 1 can interact with feed holes in the polymer frames 20 as will be described, and can be removed after the stack is created. Excess material of the frames can be trimmed and the housing can be added for sealing. Before removal, rod 99 may rest for example on the bottom end frame 41 of the housing 40.

Figure 3A:
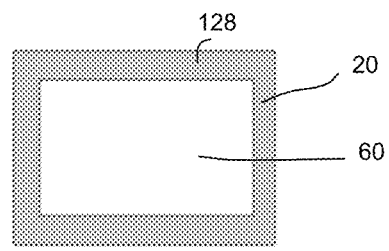
FIGS. 3a, 3b, 3c show a top view of creation of the embodiment of the battery component of the present invention.
Figure 3B:
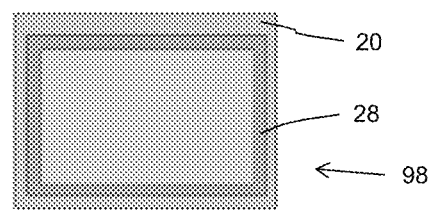
Figure 3C:
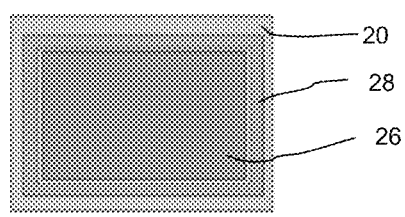
Figure 3D:
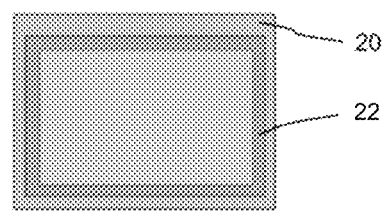
FIG. 3d shows an alternate embodiment of the battery component.

FIGS. 3a, 3b and 3c show a top view of creation of the embodiment of the battery component of the present invention, and FIG. 3d shows an alternate battery component with the bipolar current collector 22 first connected to the polymer frame.

FIG. 3a shows a side 128 of a polymer frame 20 with a rectangular window 60.

As shown in FIG. 3b, frame 20 can be placed over separator 28, which can have an anode 24 on one side and cathode 26 on the other side as shown in FIG. 1. Cathode 26 protrudes through window 60, as shown in FIG. 3c. Bipolar current collector 22, which can be a thin metal foil, then can be added over cathode 26 and attached to the frame 20 at its edges. Frame 20 likewise is attached to separator 28 around window 60.

Frame 20 and separator 28, fixedly connected, thus create an easily stackable battery component 98. Bipolar current collector 22, anode 24 and cathode 26 can be connected to this stackable component as discussed above or also can added separately or later during assembly.

The anode and the cathode advantageously can be made of polymer, glass, glass ceramic or ceramic solid-state materials, and the mechanical properties are improved and much of the mechanical stress during the cell assembly process can be retained by the polymer frame, which lowers the requirements on the assembly process. In addition, small imperfections at the solid-state material edges can be tolerated and the amount of defective goods can be decreased.

FIG. 3d shows an alternate embodiment which starts out with the same frame 20 as in FIG. 3a. Bipolar current collector 22, which can be a thin foil of aluminum coated with nickel, is placed nickel side down on the frame to overlap side 128. Gluing or other bonding can be used to attach the nickel coating to a PP/PE frame, which advantageously provides a stable connection compared to a PP/PE aluminum or copper connection. The thin foil of the current collector which is coated single sided with anode 24 or cathode 26 or coated double sided with anode 24 and cathode 26 is well stabilized by the polymer frame and can be combined with the separator separately.

Figures 4A, 4B, 4C:
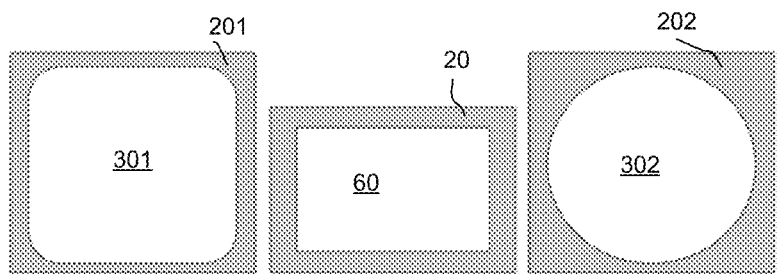
FIGS. 4a, 4b, 4c, 4d, 4e and 4f show various frame geometries of the polymer frame according to the present invention.
Figures 4D, 4E, 4F:
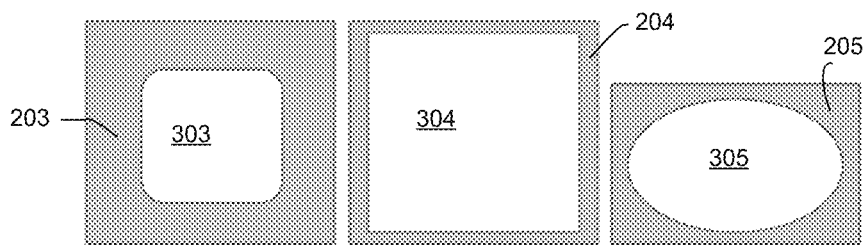

FIGS. 4a, 4b, 4c, 4d, 4e and 4f show various frame geometries of the polymer frames according to the present invention, with FIG. 4a being similar to FIG. 3a, and frames 201, 202, 203, 204, 205 having a window 301 with rounded edges, a circular window 302, a window 303 similar to window 301 but smaller for a same outer sized frame, a perfectly square window 304 and an oval window 305, respectively.

Figures 4G, 5:
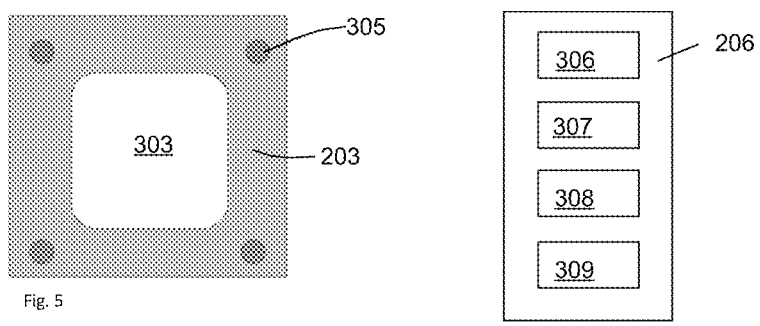
FIG. 4g shows a frame with a plurality of windows.
FIG. 5 shows a polymer frame according to the present invention with feed holes for easing assembly.

FIG. 4g shows a polymer frame 206 with for example four windows 306, 307, 308, 309.

FIG. 5 shows a polymer frame 203 according to the present invention with feed holes 305 for easing assembly.

Assembly of the FIG. 1 embodiment can occur as follows: endplate anode current collector 92 is provided, and then battery component 11 is added so that frame 20 is slid over rod 99 via a feed hole 305. Polymer frame 20 can be slid over further rods via feed holes 305. Components 12, 13, 14 and 15 then can be stacked over the rod 99 as shown in FIG. 1, and finally cathode top plate 90 added to create the battery module 10. The anode 24 of a battery component 12, 13, 14, 15 thus can rest on the bipolar current collector 22 of the battery component 11, 12, 13, 14, respectively, below.

To create the FIG. 2 embodiment the rod 99 can be removed, excess frame material trimmed, and housing 40 sides can be added and attached to the polymer frames. Alternately, the frames can be welded together between the feed holes 305 and the window and the excess frame material trimmed away. An extra housing is thus not necessary, and a extra foil or material can be used for the last compartment. Liquid or solid-state electrolyte 42 can be added to the areas formed by the housing, if present, and two polymer frames if desirable to increase efficiency.

The compartments made by the housing and the polymer frames advantageously can be sealed so that liquid or gel electrolyte 42 is isolated from each compartment to create battery cell components connected in series. One advantageous manufacturing method, for the FIG. 2 embodiment, can occur as follows:

End frame 41 with attached side walls of housing 40, or an already existing housing of similar structure is provided. An electrode, for example anode 24, is fitted into the window of end frame 41, followed by separator 28, and cathode 26. A liquid electrolyte 42 can then be added, and a polymer frame 20 with an already attached current bipolar collector 22 over the window can be placed over cathode 26. Polymer frame 20 can be attached to the housing 40 side walls in a sealed fashion, such as by gluing, welding heat bonding, lamination or adhesive tape. The welding heat bonding can for example advantageously happen from outside the housing.

The next anode 24, separator 28, cathode 26 can be added, more liquid electrolyte 42 added, and then the next polymer frame 20/bipolar current collector 22 component added and the frame 20 sealed to frame 40. When the desired number of cell components is present, the last frame 20 can have an end plate or middle plate attached and the battery cell module is complete.

Figure 6:
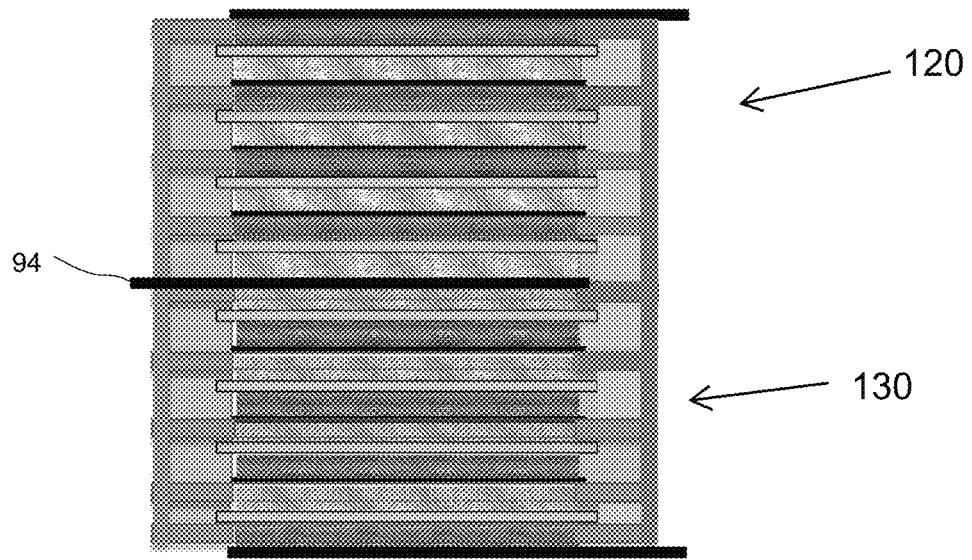
FIG. 6 shows two modules connected in parallel via a middle plate.

FIG. 6 shows a battery with two modules, the top module 120 being similar to module 10 but having a plate or tab at the anode side extending in a different lateral direction, this plate being a so-called middle plate 94. The bottom frame of top module 120 can be omitted. The bottom module 130 can simply be the inverse, with an anode extending through a window contacting the middle plate 94 and the frames bonded together with the middle plate or tab 94 extending, preferably on a side opposite the cathode end plates. As an alternative, the end plates can be anode end plates and the cathode can extend in the middle.

Different battery modules with different endplate configurations advantageously can be created, and then connected in series or in parallel to create different battery capacities or voltages. Specifically, a battery module with simply one endplate at an end of the housing, either a cathode or anode endplate, can be created, identified herein as a module EP, the endplate preferably extending laterally past the housing. For parallel connection with such a module EP, a so-called module EMP with one endplate and one middle plate connector, extending laterally from another side of the housing as the endplate, can be created. A module MP with solely one middle plate and no other endplate, and a module TMP with two middle plates can also be created. These modules, EP, EMP, MP and TMP can be combined in series or parallel to create different battery capacities and voltages. The bipolar current collectors can weld together, as can the frames at the connections.

FIG. 6 thus shows a EMP/EP combination.

Figure 7:
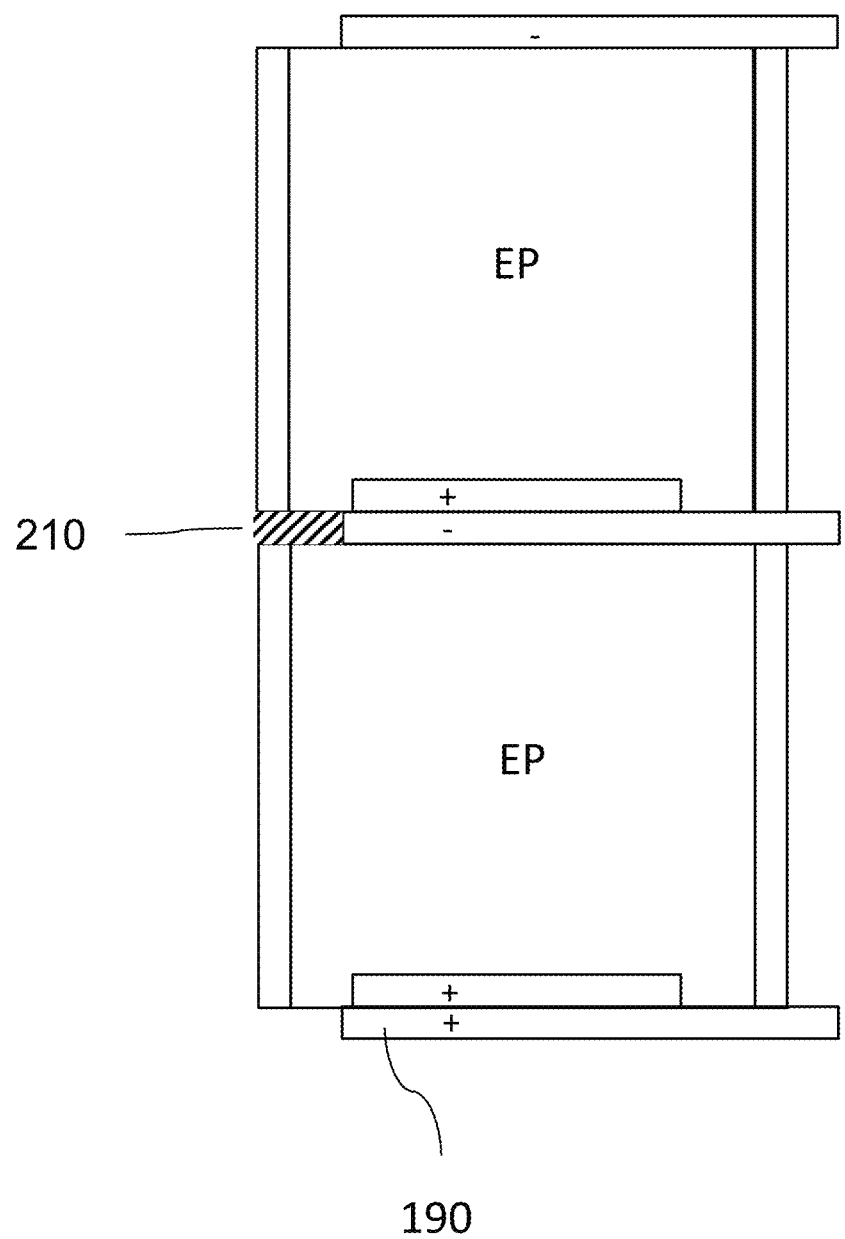
FIG. 7 shows schematically two modules connected in series.

FIG. 7 for example shows two modules EP in series with the frame bonded at a weld 210, and an extra end plate 190 to create a higher voltage battery.

Figure 8:
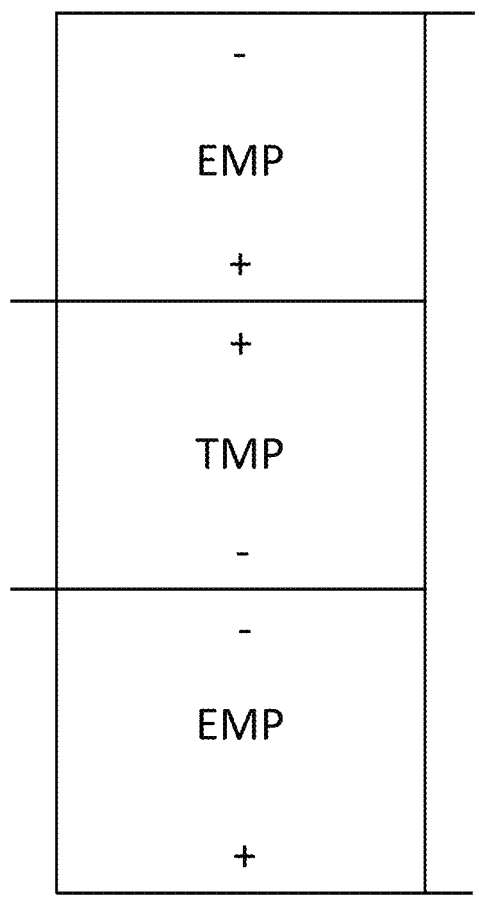
FIG. 8 shows three modules connected in a further configuration.

FIG. 8 shows schematically a further battery configuration with two EP modules and a TMP module in the middle. Other configurations such as EP/MP/EMP or EP/MP/TMP/EP are also possible.

Figure 9:
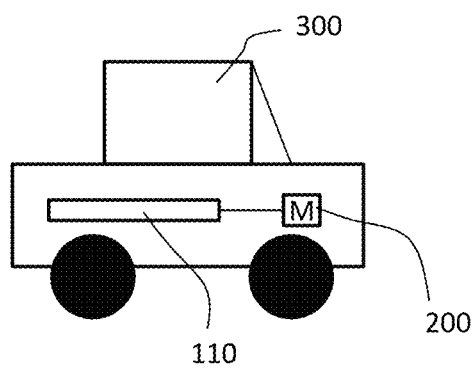
FIG. 9 shows schematically an electric or hybrid vehicle with an electric battery made of the battery module cells.

As shown in FIG. 9, in one application, the battery cell module or stack 110 can be created for example with a much larger number of battery cells for providing power as an electric battery to an electric motor 200 for powering an electric vehicle 300.

The resulting polymer frame stacked battery also allows the separation of anode and cathode in extra compartments and allows the usage of different anolytes and catholytes. For example, the one electrode side could have a liquid or gel-polymer type electrolyte and the second electrode side can use a solid-state electrolyte or even no electrolyte at all.

By attaching the separator-polymer frame unit to the housing the separator can no longer move or slide inside the cell. Therefore, this unit is more resilient and can better tolerate vibrations or shocks as they occur when having batteries in cars or any transportable device, because the position of the whole cell stack is fixed inside cell.

Likewise if the bipolar current collector-polymer frame unit embodiment is used, the bipolar current collector is well protected.

What is claimed is:

1. A method for manufacturing a battery module comprising:
   stacking a plurality of battery cell units inside walls of a housing, each battery cell unit including a polymer frame having a window and a battery cell having a cathode, an anode, and a separator separating the cathode and the anode, and a bipolar current collector, the window receiving part of the battery cell; and
   connecting the polymer frames to the walls of the housing, two of the plurality of polymer frames and the walls of the housing defining an electrolyte compartment.

2. The method as recited in claim 1 wherein the connecting includes sealing the polymer frames to the walls of the housing so that the compartment is a sealed compartment.

3. The method as recited in claim 2 wherein the polymer frames are stacked using a rod interacting with a feed hole in the polymer frames.

4. The method as recited in claim 2 wherein the sealing of the polymer frames to the walls of the housing is performed by gluing, welding heat bonding, lamination or adhesive tape.

5. The method as recited in claim 1 wherein the stacking of the plurality of battery cell units includes providing a first battery cell unit inside the walls of the housing, then providing a second battery cell unit inside the walls of the housing on top of the first battery cell unit,
the first battery cell unit including a first polymer frame including a first window and a first battery cell including a first cathode, a first anode, a first separator and a first bipolar current collector, the second battery cell unit including a second polymer frame including a second window and a second battery cell including a second cathode, a second anode, a second separator and a second bipolar current collector.

6. The method as recited in claim 5 wherein the electrolyte compartment is defined by the walls of the housing, the first polymer frame and the second polymer frame after the second battery cell unit is provided on top of the first battery cell unit.

7. The method as recited in claim 5 wherein the providing of the first battery cell unit includes providing the first cathode, the first separator and the first anode on an endplate current collector and an end frame, and providing the first polymer frame and the first bipolar current collector on the first cathode, the first separator and the first anode.

8. The method as recited in claim 7 wherein the providing of the first battery cell unit includes providing the first anode or the first cathode in a window of the end frame.

9. The method as recited in claim 7 wherein the providing of the second battery cell unit on top of the first battery cell unit includes providing the second cathode, the second separator and the second anode on the first bipolar current collector, and providing the second polymer frame and the second bipolar current collector on the second cathode, the second separator and the second anode.

10. The method as recited in claim 9 wherein the second separator and the second anode are provided on the first bipolar current collector.

11. The method as recited in claim 10 wherein the second polymer frame and the second bipolar current collector are provided on the second cathode, the second separator and the second anode.

12. The method as recited in claim 11 wherein the second polymer frame is attached to the second bipolar current collector prior to being provided on the second cathode, the second separator and the second anode.

13. The method as recited in claim 1 wherein the two polymer frames include a first polymer frame and a second polymer frame forming the electrolyte compartment.

* * * * *